United States Patent [19]
Oda

[11] Patent Number: 5,218,609
[45] Date of Patent: Jun. 8, 1993

[54] SOLID LASER OSCILLATOR

[75] Inventor: Seiji Oda, Kanagawa, Japan

[73] Assignee: Tosoh Corporation, Yamaguchi, Japan

[21] Appl. No.: 762,210

[22] Filed: Sep. 19, 1991

[30] Foreign Application Priority Data

Sep. 19, 1990 [JP] Japan .................................. 2-247062

[51] Int. Cl.⁵ ............................................. H01S 3/10
[52] U.S. Cl. ...................................... 372/20; 372/22; 372/10
[58] Field of Search ....................... 372/36, 21, 22, 20, 372/29, 10

[56] References Cited

U.S. PATENT DOCUMENTS

| | | | |
|---|---|---|---|
| 4,019,159 | 4/1977 | Hon et al. | 372/29 |
| 4,868,834 | 9/1989 | Fox | 372/20 |
| 4,965,803 | 10/1990 | Esterowitz et al. | |
| 5,001,716 | 3/1991 | Johnson et al. | 372/12 |
| 5,025,446 | 6/1991 | Kuizenga | 372/22 |
| 5,029,335 | 7/1991 | Fisher et al. | 372/36 |
| 5,030,851 | 7/1991 | Unternahrer | 372/22 |

FOREIGN PATENT DOCUMENTS

| | | |
|---|---|---|
| 0097241 | 1/1984 | European Pat. Off. . |
| 0238142 | 9/1987 | European Pat. Off. . |
| 2234852 | 2/1991 | United Kingdom . |

*Primary Examiner*—Léon Scott, Jr.
*Attorney, Agent, or Firm*—Sughrue, Mion, Zinn, Macpeak & Seas

[57] ABSTRACT

In a tunable solid laser oscillator that uses titanium-doped sapphire as a laser medium the improvement wherein a light source of non-continuous radiation is used as an exciting light source and a Q-switching mechanism is placed within the cavity at a position where laser light to be produced will make at least one pass through the device.

13 Claims, 3 Drawing Sheets

SOLID LASER OSCILLATOR

BACKGROUND OF THE INVENTION

This invention relates to a laser oscillator that uses as a laser medium a single-crystal material doped with titanium, typically titanium-doped sapphire which is generally referred to as "Ti:sapphire". More particularly, this invention relates to an improved laser oscillator that uses Ti:sapphire as a laser medium and that is adapted to perform turnable operation so as to produce a single-pulsed laser output at a large peak power in a consistent way.

Lasers capable of producing a pulsed output of short duration at a high peak power are suitable for use in precision measurements, evaluation of high-speed operations, etc. In particular, lasers that use Ti:sapphire as a laser medium are tunable in wavelength and suitable for use in spectroscopic measurements.

Ti:sapphire has long been used as a medium for tunable lasers. Dye lasers that use dyes dissolved in liquid solvents as laser media are also tunable in wavelength. However, the range of wavelengths that can be tuned with dye lasers is no more than about 50 nm, which is smaller than the range (500 nm) that can be tuned with Ti:sapphire. In addition, it is difficult to generate large-energy output oscillation with dye lasers. Further, dye lasers which often use toxic fluids are not easy to handle and their running cost is undesirably high.

Conventional pulsed lasers of short duration that use Ti:sapphire as a laser medium adopt a continuous-wave (CW) operating argon ion laser as a pumping (light) source and they have principally been operated with the internal cavity modes being locked by means of an electrooptical (EO) device, an acoustooptical (AO) device or some other suitable device that is placed within the cavity. Mode locking is a technique for allowing a laser to be oscillated in the sole internal lasing mode. Laser light travels back and forth many times through the cavity and by insuring that an optical device in the cavity will cause a smaller optical loss when a single laser pulse of short time duration (i.e., lasing mode) passes through it than in other cases, laser light of short pulses can be selectively generated. Examples of optical devices used for mode locking purposes include EO and AO devices.

Obviously, in order to obtain laser light of short pulses by mode locking, a high-frequency signal must be applied to the optical device of interest at time intervals that correctly match the passage of an oscillating laser pulse through the device. The frequency of the signal is the inverse of the time required for the oscillating light to travel through the cavity in one forward or return path. Stable pulsed laser light cannot be obtained unless the correct value of frequency is selected. Even if it is possible, the waveform of the obtained pulse will often contain sags (or droops) and other distortions that would be absent if an ideal temporal waveform were obtained. To avoid this problem, precision devices are required but then the construction of the equipment becomes complex.

Generally, a light source capable of emitting continuous radiation is desirably used as an excitation light source if mode locking is to be performed. If a source of non-continuous pumping light is to be used, either of the following two methods may be adopted. One method is using pulsed light that is applied repetitively at the same frequency as the one discussed above. In this case, the input pumping light has the same frequency as the signal to be applied to the optical device of interest but the resulting time lag makes it even more difficult to apply the signal on well-timed relationship. As a further problem, it is also considerably difficult to obtain a light source capable of emitting light at the desired high frequency. According to the other method, the time duration of each pulse from the pumping light source is extended to provide quasi continuous radiation so that more than one laser light of short pulses can be obtained within the time period of application of the input pulse. If this method is adopted, there is no need to match the timing of input exciting light with that of the application of a signal to the optical device of interest. However, individual laser pulses have different intensities of light.

Lasers that constitute Ti:sapphire as a laser medium may adopt adw argon ion laser, a CW Nd:YAG laser and some other CW light sources. However, with these lasers, the maximum efficiency of energy conversion from the input electric power to the pumping laser light that can be achieved is only about 1%, and energy conversion of the pumping light to oscillating lights in the Ti:sapphire laser oscillator is no more than 1%. Therefore, the overall efficiency of energy conversion from input electric power to the Ti:sapphire laser light is less than $1 \times 10^{-4}$. Another drawback of this method is that it is incapable of producing laser light of high intensity. Further, the need to combine two units of cavity increases the complexity of the optical system in the equipment, which unavoidably causes an increase in its size.

A Ti:sapphire laser oscillator that uses a flash lamp or some other light source of non-continuous radiation as an exciting light source is capable of producing pulsed light in a convenient way by conventional oscillation methods. However, "spiking" (the generation of pulses each containing more than one peak) occurs to producing only laser light that has a comparatively small peak energy.

In "side-pumping" where a laser medium is excited from its lateral side by means of a pumping light source such as a flash lamp, the greater part of the energy of the exciting light fails to be used in excitation of the laser medium, whereby only laser light of lower efficiency of optical energy conversion is obtained. A side-pumping sapphire laser oscillator is capable of producing pulsed light in a convenient way by conventional oscillation methods.

A simplified version of laser oscillator has been proposed that uses a laser medium such as a Nd-doped single-crystal material (e.g. ND:YAG) and that is excited with a high-output semiconductor laser. The major advantage of this laser oscillator is its ability to produce a peak energy during pulse oscillation. However, the wavelength (typically in the range of 1000–1100 nm) at which this laser oscillator can operate is not tunable although it is attainable with semiconductor lasers. As a further problem, semiconductor lasers which operate at wavelengths of 700 nm and longer are not suitable for use as light sources to excite Ti:sapphire whose excitation wavelength lies in the neighborhood of 500 nm.

SUMMARY OF THE INVENTION

As a result of the extensive studies conducted to develop a laser oscillator that is free from the aforementioned problems of the prior art, the present inventors found the following: a laser oscillator uses a titanium-doped single-crystal material, in particular, Ti:sapphire as a laser medium, 1) in which a Q switching element such as an EO device for effecting "Q switching" is disposed within the laser oscillator which adopts a light source of non-continuous radiation as an exciting light source, and/or 2) in which a Q switching element is disposed within the laser oscillator of "longitudinal excitation" type wherein a laser medium is injected with light in a direction parallel to the optical axis of the laser light as an exciting light source. The laser oscillator includes either or both the above-mentioned structures 1) and/or 2), so that a tunable laser capable of producing single pulses with high peak energy could be obtained by the "Q switching" in which the optical loss within the cavity is merely switched momentarily from a high value to a low value.

Further, the present inventors found that a laser oscillator can use a titanium-doped single-crystal material, in particular, Ti:sapphire as a laser medium, 3) in which the laser oscillator uses a simplified version of tunable laser that can be obtained by using the second harmonic of a semiconductor laser as a source of exiting light.

The present invention has been accomplished on the basis of these findings.

Thus, according to the present invention, 1) a solid laser oscillator uses Ti:sapphire as a laser medium in which the laser oscillator adopts a light source of non-continuous radiation as an exciting light source and incorporates a Q switching mechanism in the cavity, 2) a solid laser oscillator uses Ti:sapphire as a laser medium in which a Q switching mechanism is disposed within the laser oscillator wherein a laser medium is injected with light in a direction parallel to the optical axis of the laser light, and/or 3) a laser oscillator uses a titanium-doped single-crystal material as a laser medium in which the laser oscillator uses a simplified version of a tunable laser that can be obtained by using the second harmonic of a semiconductor laser that operates at a wavelength of 800–1200 nm as a source of exiting light. At least one of the above-mentioned structures 1), 2) and/or 3) is used in a solid laser oscillator having a tunable laser according to the present invention.

DETAILED DESCRIPTION OF THE INVENTION

Figure 1:
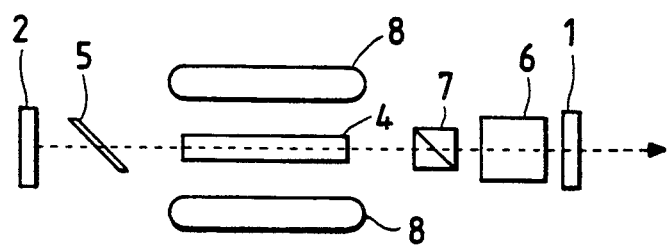
FIG. 1 is a schematic diagram of a Ti:sapphire laser oscillator according to an embodiment of the present invention.

The laser oscillator of the present invention uses a titanium-doped single-crystal material, typically titanium-doped sapphire (i.e. Ti:sapphire) as a laser medium. The amount of titanium doped to the laser medium may be the same as is commonly used in conventional Ti:sapphire and is typically in the range of 0.01–0.5 wt%. If the titanium content is less than 0.01 wt%, the amount of amplification is insufficient to achieve satisfactory laser oscillation. If the titanium content exceeds 0.5 wt%, the figure of merit (FOM) of the laser medium decreases to cause difficulty in laser oscillation.

In the first aspect of the present invention, a Q switching element such as an EO or AO device is used in the cavity of a solid laser oscillator such that an effective Q switching action can be obtained in the Ti:sapphire laser oscillator. In response to an electric or acoustic or other signal, those devices, are capable of setting two different Q-values of the oscillator, one for oscillation and the other for non-oscillation, and switching between the two values can be accomplished within a shorter period than the pulse-width of the oscillating laser. The term "Q switching" as used herein means a technique for suppressing oscillation by an optical device until a sufficient energy builds up in the Ti:sapphire, then suddenly switching to the large Q value for oscillation, thereby obtaining single-pulsed laser light having high energy. In view of this, the switching speed is desirably faster than 500 nsec, more preferably faster than 50 nsec since the pulse-width of the laser light generated from the oscillator of interest is faster than 50 nsec. The faster the switching speed is, the higher the efficiency of Q switching action is. It should, however, be noted that single pulses cannot be obtained if Q switching is effected prematurely whereas laser light of satisfactory energy cannot be produced if Q-switching occurs too late.

In the case of mode locking, the switching described above must be repeated at high frequency but, in the case of Q switching, at least one switching action need only be performed when sufficient energy builds up in the Ti:sapphire. Another advantage is that there will be no great variations in the temporal waveform of laser oscillation even if the timing the of switching action is offset by several microseconds. In the case of mode locking, the timing must be controlled to insure that the offset will not exceed 10 psec under any circumstances.

The solid-store laser oscillator according to the first aspect of the present invention uses an exciting light source that emits non-continuous radiation. The time duration of pulses emitted from the exciting light source is desirably longer than that of laser pulses produced from the oscillator as excited by said light source and is preferably at least 500 nsec in terms of full-width of half maximum (FWHM). If the time duration of interest is shorter than 500 nsec, there is no need to perform Q switching since the laser will not oscillate until the largest excitation energy builds up even if the oscillation is not suppressed. Further, it is difficult to construct a pulsed light source of high optical intensity with shorter pulse-width 500 nsec without employing bulky equipment as the light source.

No matter how long the time duration of pulses emitted from the exciting light source, and even with a light source of continuous radiation in an extreme case, Q switching can be performed. However, in the case of a light source that emits continuous radiation, the efficiency of excitation energy buildup as compared to the absorption of exciting light will decrease with increasing energy buildup time (t). The efficiency of interest ($\eta$) is given by the following equation:

$$\eta = T/t\{1 - exp(-t/T)\}$$

where T is the excitation lifetime of Ti:sapphire. Under the circumstances, a pulsed light source of 30 μsec and shorter is desirably used in order to build up an excitation energy of 10% or more for the absorption. Even in the case of using a light source for continuous exciting radiation, the emission of laser light may be immediately followed by Q switching that consists of repeated suppression of oscillation and its release at a rate of one switching per 30 μsec or shorter However, not only is this technique cumbersome due for the need to repetitive operations, but also a light source that is bulky compared to a pulsed light source is required for producing one laser pulse of a given energy. This is because all light sources generate heat and need be cooled to avoid deterioration in durability but a pulsed light source does not generate heat during the period of nonradiation and the size of the cooling equipment can accordingly be reduced. Hence, a pulsed light source of 50 nsec—30 [sec that can be constructed with comparative ease is optimal as a source of exciting light and eventually contributes to the fabrication of a simplified laser oscillator.

The composition of the solid state laser oscillator according to the first aspect of the present invention is described below with reference to FIG. 1 which is a schematic diagram of an embodiment of the present invention in which a Pockel's cell as an Q-switching device and a filter for wavelength selection are provided within the laser cavity. Shown by 6 is the Pockel's cell having both end faces provided with an anti-reflexic (AR) coating; 4 is a Ti:sapphire rod; 8 is a flash lamp for exciting the Ti:sapphire; 1 and 2 are mirrors of which the laser cavity is composed; 5 is a birefringent filter as a wavelength selecting device; and 7 is a polarizer.

The composition of the solid state laser oscillator according to the first aspect of the present invention is in no way limited to that shown in FIG. 1 and the EO device serving as a Q switching element may be replaced by an AO device made of piezoelectric material. When a Pockel's cell is used as a Q switching element, voltage may be applied to suppress oscillation and removed to trigger oscillation. The switching rate will vary with the specific structure of the cavity and in the embodiment shown in FIG. 1, it may be 500 nsec and shorter. In this case, the faster the switching speed, the narrower the width of pulses produced. In accordance with the present invention, the Q switching element is placed within the cavity at a position where oscillating laser light will make at least one pass through said element during a trip in the cavity, such as between the laser medium 4 and the output mirror 1. For the Ti:sapphire laser medium, it is particularly preferred to have the exciting light source emit radiation at wavelengths of 400-600 nm.

The laser oscillator according to the first aspect of the present invention uses an exciting light source that emits non-continuous radiation. Examples of such sources of non-continuous radiation include a flash lamp, a light-emitting diode and a semiconductor laser. There is no particular need to insure that the pumping light will be injected in alignment with the co-axis for the oscillating laser beam, that is end-pumping alignment, but somewhat better efficiemey is achieved by the end-pumping alignment. A minimum level for the input energy of the exciting light source may be the threshold for laser oscillation in the absence of Q switching but to achieve efficient Q switching, the input energy is preferably at least 10 times as high as the threshold level. The other features of the composition of the laser oscillator according to the first aspect of the present invention may be the same as in the case of conventional oscillators.

Figure 2:
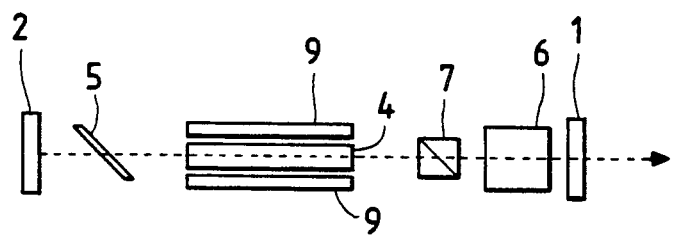
FIG. 2 is a schematic diagram of a Ti:sapphire laser oscillator according to another embodiment of the present invention.
Figure 5:
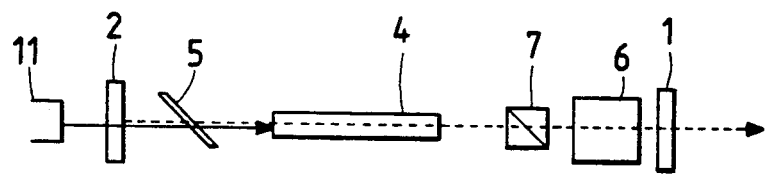
FIG. 5 is a schematic diagram of the laser oscillator used in Examples 4 and 5.

Other embodiments of the present invention are shown in FIGS. 2 and 5, in which the same components as those shown in FIG. 1 are identified by like numerals. A second embodiment of the present invention which uses a light-emitting diode (LED) array to excite Ti:sapphire is shown in FIG. 2, in which the LED array is indicated by 9. FIG. 5 is a schematic diagram of a solid laser oscillator according to still another embodiment of the present invention, in which a Pockel's cell as an EO device and a filter for wavelength selection are provided within the cavity. Shown by 6 is the Pockel's cell having both end faces provided with anti-reflective (AR) coating; 4 is a Ti:sapphire rod; 11 is a neodymium-doped YAG laser (for producing the second harmonic output) or an argon ion laser for exciting the Ti:sapphire. 1 and 2 are mirrors of which the laser cavity is composed; 7 is a polarizer; and 5 is a birefringent filter as a wavelength selecting device.

The Q switching element to be used in this embodiment may be of the same type as used in the first and second embodiments and it is placed within the cavity at a position where laser light to be produced will make at least one pass through said element, such as between the laser medium and the mirror at the exit end of the cavity. In the embodiment of end-pumping oscillator, the Q switching element desirably is not placed in the position where it is transmitted by the exciting light.

The laser oscillator shown in FIG. 5 is of a "longitudinal excitation type", in which exciting light is emitted into the laser medium in a direction parallel to the optical axis of laser light to be produced. In longitudinal excitation, the greater part of the energy of emitted light can be used to induce excited atoms to amplify laser light and, hence, a laser oscillator of the longitudinal excitation type has the advantage of achieving a higher efficiency of optical energy conversion than the lateral excitation type.

For the Ti:sapphire laser medium used in the embodiment under discussion, it is particularly preferred to have the exciting light source emit radiation at wavelengths of 400-600 nm. Examples of useful light sources according to a second aspect of the present invention include an argon ion laser, the second harmonic of a neodymium-doped solid state laser (especially, the second harmonic of a Nd:YAG laser), a metal vapor laser (especially, a copper vapor laser) a semiconductor laser, the second harmonic of a semiconductor laser and the radiation of parametric oscillation as produced from other lasers. A minimum level for the input energy of the exciting light source may be the threshold for laser oscillation in the absence of Q switching but to achieve efficient Q switching, the input energy is preferably at least 10 times as high as the threshold level.

In accordance with a third aspect of the present invention, there is provided a solid state laser oscillator that uses a titanium-doped single-crystal material as a laser medium and the most preferable crystal is sapphire.

The single-crystal material is preferably doped with trivalent titanium and those which are doped with divalent or tetravalent titanium are not suitable for use as the active material of laser medium. The pumping light sources should at least emit light that is capable of exciting trivalent titanium. Trivalent titanium is excited the most efficiently with light having a wavelength of 490 nm but it can be excited with any light having wavelengths of 400-600 nm.

As far as the present inventors searched through literature, no case has been known to date that reports the fabrication of a semiconductor laser that operates at wavelengths within the range specified above. The semiconductor laser to be used in the third aspect of the present invention must at least operate at wavelengths of 800-1200 nm, i.e., at wavelengths that are twice as long as the wavelength of light that are capable of exciting trivalent titanium. Then, the second harmonic of this semiconductor laser (400-600 nm) can be used as a pumping light source and can be used for continuous or pulse oscillation. The semiconductor laser preferably emits light at an intensity of at least 0.5 W and/or the second harmonic of the laser light preferably has an intensity of at least 0.1 W.

In a pulse operation, it may be desirable that the optical output energy of the semiconductor laser light is not less than 5 $\mu$J per pulse and/or the optical output energy of the second harmonic of a semiconductor laser is not less than 0.5 $\mu$J per pulse. Further, it is desirable that the full-width of half maximum (FWHM) is not more than 1$\mu$sec in the second aspect of the present invention.

Figure 8:
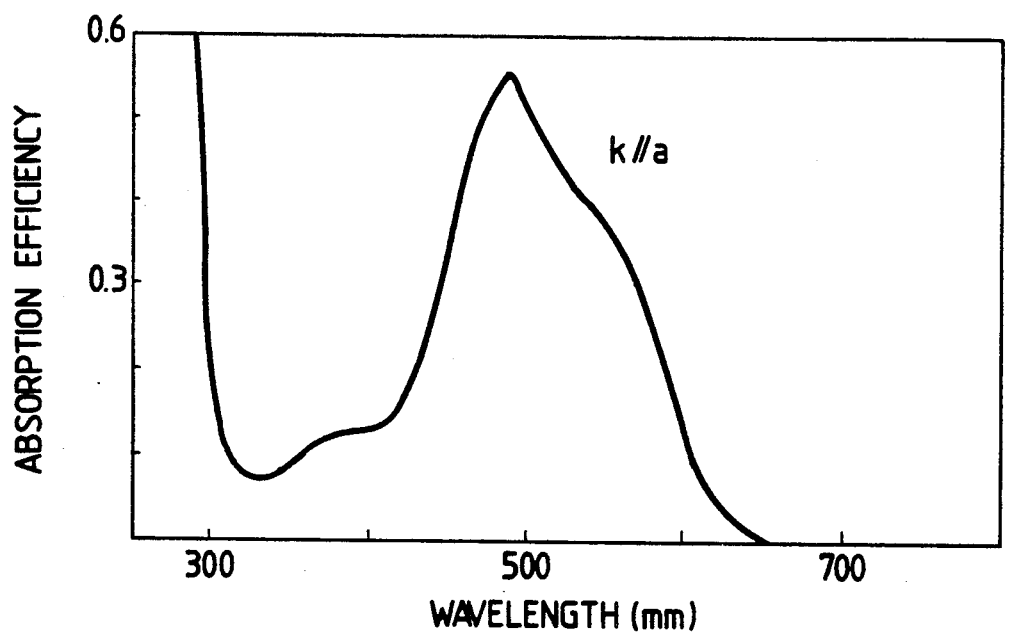
FIG. 8 is a diagram showing an absorption spectrum for Ti:sapphire.

The second aspect of the present invention is described below specifically with reference to laser oscillation by pulsed semiconductor laser light but it should be noted that the same explanation will apply to oscillation by CW semiconductor laser. For creating a lasing action in a laser medium, it is at least necessary for the activator in the laser medium to undergo population inversion. When Ti:sapphire is to be excited by the second harmonic of pulsed light from a neodymium-doped yttrium lithium fluoride laser (ND:LiFY$_4$ which is hereunder simply referred to as Nd:YLF), it is generally held that excitation by an absorption energy of at least 3.9 $\mu$J/pulse is necessary. It is therefore estimated that the light intensity necessary to create population inversion in the active material would be at least as much as has been necessary with the second harmonic of the Nd:YLF laser. As one can see from FIG. 8 which shows an absorption spectrum for Ti:sapphire, the excitation efficiency that is potentially achieved at the wavelength of 490 nm which has the highest absorption efficiency is approximately 1.4 times as high as the value obtained with the second harmonic of the Nd:YLF laser.

Figure 7:
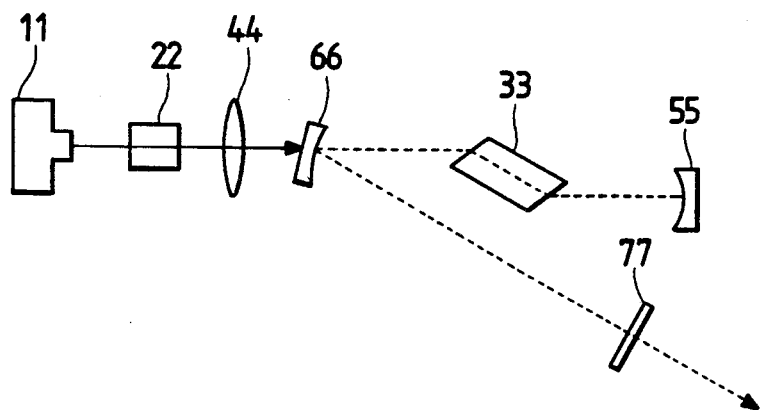
FIG. 7 is a schematic diagram of the laser oscillator using the second harmonic of a semiconductor laser as a source of exciting light.

An embodiment of the solid state laser oscillator according to the third aspect of the present invention is described below with reference to FIG. 7 which is a schematic diagram of a laser oscillator that is so constructed that a high-output semiconductor laser, is adapted to emit a second harmonic wave that is emitted into an end face of Ti:sapphire. Shown by 11 in FIG. 7 is the high-output semiconductor laser used as a part of a pumping light source for exciting Ti:sapphire. The laser light is efficiently injected into a waveguide 22 which generates a second harmonic. The generated second harmonic is focused by a lens 44 to be injected into a Ti:sapphire rod 33 through its end face. Shown by 55, 66 and 77 are mirrors of which the laser cavity is composed. The layout of the laser oscillator according to the third aspect of the present invention is in no way limited to the case shown in FIG. 7 and any other configuration may be adopted that allows the second harmonic of the semiconductor laser to be efficiently injected into the Ti:sapphire rod for achieving efficient laser oscillation with the energy of the input light. An example of such a configuration is the use of plural semiconductor lasers whose second harmonics are combined and carried through a light-transmitting optical fiber for injection into the laser rod.

As will be understood from the foregoing description, the present invention provides a tunable laser oscillator that achieves high efficiency of energy conversion from electric power, that produces laser light of high intensity and peak power, and that is capable of producing an output of short single pulses in a consistent way. This oscillator is simple in construction, and can be adjusted with great ease. As an additional advantage, the oscillator features high safety.

All of the components of the laser oscillator of the present invention are small solid devices, so it provides a small laser light source that can be tuned in wavelength in a convenient way. The laser light source provided by the present invention is useful almost indefinitely, achieves high efficiency of energy conversion, requires smaller power consumption and is practically maintenance-free. In addition, the laser oscillator of the present invention is portable and can be used to perform measurements even at sites that have been unaccessible by laser light from the prior art versions. As a further advantage, the oscillator can be excited by pulsed light from a semiconductor laser and yet its operating speed is comparable to that of the semiconductor laser.

Because of these advantages, the laser oscillator of the present invention has potential use as a light source in various applications including a medical field (e.g. optical CT), optical communications (e.g. novel techniques of frequency modulation), spectroscopy (e.g. spectroscopic analyzers), evaluation of novel optical materials and novel measurement techniques. The laser oscillator also makes it possible to perform various measurements not only, in vehicles, aircraft and ships where conventional apparatuses, which are bulky and difficult to service, have been unable to have satisfactory access but also on those machines and equipment that cannot be carried to the site of measurement. As a further advantage, the laser oscillator holds promise for operation on pico- and fernto-second pulses and hence can potentially facilitate the measurement Of high-speed phenomena.

EXAMPLE 1

A laser oscillator having the composition shown in FIG. 1 was fabricated. The Ti:sapphire rod was doped with 0.1 wt% Ti and had a length of 50 mm. The mirror at the output end of the laser cavity had a transmittance of 2-20%. The flash lamp was supplied with an electric energy of 200 J and it produced pulses of a width of 8 $\mu$sec. Oscillation was suppressed when the Pockel's cell was supplied with a voltage of 3-4 kV. The switching rate was no more than 50 nsec and the timing of the switching action was delayed 1-5 $\mu$sec after the rise time of current to the flash lamp. With optimum timing, the laser oscillator produced single-pulsed light having a peak power ca. 5-20 times high as that obtained in Comparative Example 1, described below. The time duration of the produced pulses was 20-100 nsec and the output energy of the pulsed laser light was 10-150 mJ. The efficiency of energy conversion from electric power was $1.5 \times 10^{-4} - 6.0 \times 10^{-4}$. The tunable wavelength range was 730-920 nm and within the effective wavelength range of the mirrors in the laser cavity.

EXAMPLE 2

A laser oscillator having the composition shown in FIG. 1 was fabricated to the same specifications as in Example 1 except that the flash lamp produced pulses of a width of 4 μsec. Oscillation was suppressed when the Pockel's cell was supplied with a voltage of 3-4 kV. The switching rate was no more than 50 nsec and the timing of the switching action was delayed 1-5 μsec after the rise time of current to the flash lamp. With optimum timing, the laser oscillator produced single-pulsed light having a peak power ca. 10-30 times as high as that obtained in Comparative Example 1. The time duration of the produced pulses was 20-100 nsec and the output energy of the pulsed laser light was 10-150 mJ. The tunable wavelength range was 730-920 nm and within the effective wavelength range of the mirrors in the laser cavity.

EXAMPLE 3

A laser oscillator having the composition shown in FIG. 2 was fabricated. The Ti:sapphire rod was doped with 0.1 wt% Ti and had a length of 50 nm. The mirror at the output end of the laser cavity had a transmittance of 2-20%. The LED array was supplied with a total electric power of 3 J per pulse with a FWHM of 5 μsec and emitted at a wavelength of 570 nm. Oscillation was suppressed when the Pockel's cell was supplied with a voltage of 3-4 kV. The switching rate was no more than 10 nsec and the timing of the switching rate was delayed 1-10 μsec after the rise time of current to the flash lamp. With optimum timing, the laser oscillator produced single-pulsed light having a peak power ca. 5-10 times as high as that obtained in this oscillation without Q-switching. The time duration of the produced pulses was 30-200 nsec. The tunable wavelength range was 750-860 nm.

COMPARATIVE EXAMPLE 1

A laser oscillator having the composition shown in FIG. 1 was fabricated and laser oscillation was effected as in Examples 1 and 2 except that Q switching was not performed. A peak power of 500-2000W was obtained under the conditions employed in Example 1 and a peak power of 1-4 kW was obtained under the conditions of Example 2. Spiking occurred under either conditions and the temporal pulse waveform was such that 3-10 single pulses of 100-400 nsec overlapped. The other characteristics of the laser output were comparable to those obtained in Examples 1 and 2.

COMPARATIVE EXAMPLE 2

Figure 3:
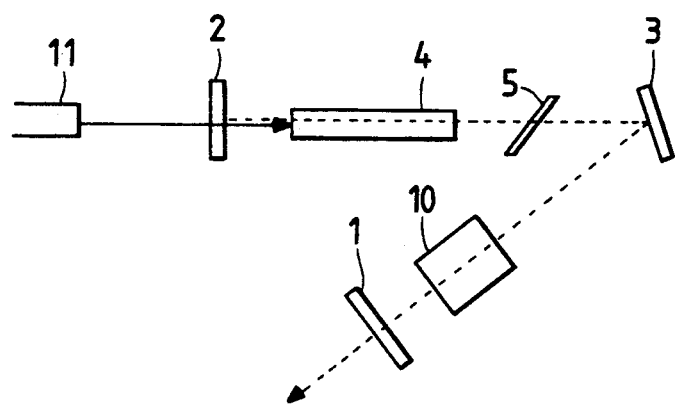
FIG. 3 is a schematic diagram of a Ti:sapphire laser oscillator that uses a continuously operating argon ion laser as an excitation source.

A laser oscillator having the composition shown in FIG. 3 was fabricated. It was adapted to perform mode locking within the Ti:sapphire laser being excited by a CW operating laser. Shown by 11 in FIG. 3 was a 10 WCW argon ion laser, 4 was a Ti:sapphire rod doped with 0.1% Ti, 10 was an AO mode locker, 1-3 were mirrors of which the laser cavity was composed, and 5 was a birefringent filter. A laser oscillation test was conducted by exciting the Ti:sapphire with the argon ion laser while the AO mode locker was driven. The drive frequency of the OA mode locker was 50-200 MHz. However the actual frequency at which mode locking was established varied with fine adjustments of the cavity and had to be controlled with <1% precision. The laser light obtained had a wavelength of 730-920 nm, an average power of 100-200 mW, an energy per output per pulse of ca. 1 nJ, and a peak power of ca. 5 kW. The argon ion laser was supplied with a total electric power of 2 kW. The efficiency of energy conversion from electric power was $5 \times 10^{-5}$. The width of pulses produced from the laser oscillator was narrower than that of pulses produced in Examples 1-3 and was in the range of 1-2 psec.

COMPARATIVE EXAMPLE 3

Figure 4:
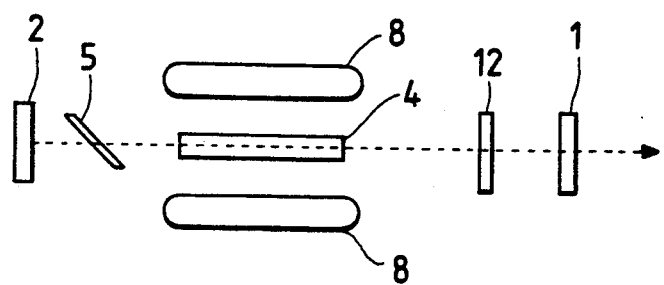
FIG. 4 is a schematic diagram of a Ti:sapphire laser oscillator that uses a saturable absorber.

A laser oscillator having the composition shown in FIG. 4 was fabricated. It was adapted to perform mode locking on a Ti:sapphire laser being excited by the flash lamp used in Example 1. Shown by 12 in FIG. 4 was a cell of 0.5 mm thick through which a saturable absorber was circulated as it was cooled at 20° C. The absorber was a dye IR-125 ($6 \times 10^{-6}$ mol/L) dissolved in dimethyl sulfoxide (DMSO). Since this dye solution was toxic, it had to be handled with care being taken to assure safety, say by using a mask to prevent inhalation. In addition, the dye solution having a comparatively short service lifetime had to be replaced frequently. Furthermore, any change in the dye concentration made the solution unsuitable for use as a saturable absorber in the laser oscillator. A laser oscillation test was conducted with an electric power of 250 J being supplied to the flash lamp in one pulse. As a result, laser light was produced that had a wavelength of 770 nm, an output energy of 20 mJ per pulse and a pulse width of 100 psec with FWHM. However, the peak power of the laser output could not be made larger than when no mode locking was effected. In order to perform wavelength tuning, either the dye concentration or its kind had to be changed.

EXAMPLE 4

A laser oscillator having the composition shown in FIG. 5 was fabricated. The Ti:sapphire rod was doped with 0.1 wt% Ti and had a length of 50 nm. The mirror at the output end of the laser cavity had a transmittance of 2-20%. The second harmonic of a Nd:YAG laser was used an pumping light source; it had an optical energy of 3 mJ per pulse with a FWHM of 1 μsec. Oscillation was suppressed when the Pockel's cell was supplied with a voltage of 3-4 kV. The switching rate was no more than 50 nsec and the timing of the switching action was delayed 0.1-5 μsec after the emission of pumping light. With optimum timing, the laser oscillator produced single-pulsed light having a peak power ca. 5-20 times as high as that obtained in Comparative Example 4. The time duration of the produced pulses was 20-100 nsec and the output energy of laser light was 5-20 μJ per pulse. The tunable wavelength range was 730-890 nm and within the effective wavelength range of the mirrors in the laser cavity. The efficiency of optical energy conversion was 0.2-0.7%.

EXAMPLE 5

A laser oscillator having the composition shown in FIG. 5 was fabricated to the same specifications as in Example 4 except that a CW operating argon ion laser with an output power of 10 W was used as an pumping light source. When an oscillation test was conducted with the time low optical loss of the Q switching element being adjusted to 3 μsec and the repetition rate of the switching action set at 4–50 MHz, single-pulsed light having a peak power ca. 2–10 times as high as that obtained in Comparative Example 4 was produced at any of the frequencies used. The time duration of the produced pulses was 30–200 nsec and the variation in the intensity of laser light was no more than 0.5% per pulse. The tunable wavelength range was 750–870 nm and the efficiency of optical energy conversion was 0.05–0.6%.

COMPARATIVE EXAMPLE 4

A laser oscillator having the composition shown in FIG. 5 was fabricated and laser oscillation was effected as in Examples 4 and 5 except that Q switching was not effected. Under the conditions employed in Example 4, the Ti:sapphire laser produced a temporal pulse waveform having a train of 2–5 pulses; the peak power was 50–300 W, the time duration of pulses was 100–300 nsec (per pulse), the optical energy was 5–50 μJ per pulse, and the tunable wavelength range was 730–890 nm. Under the conditions of Example 5, the Ti:sapphire laser operated CW and produced an output of 100–300 mW over the tunable wavelength range of 730–890 nm.

COMPARATIVE EXAMPLE 5

Figure 6:
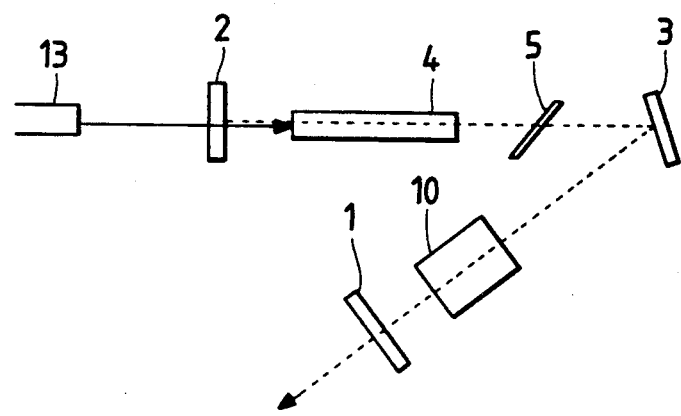
FIG. 6 is a schematic diagram of the laser oscillator used in Comparative Example 5.

A laser oscillator having the composition shown in FIG. 6 was fabricated. It was adapted to perform mode locking with the Ti:sapphire laser being excited by continuously operating laser. Shown by 13 in FIG. 6 was a continuously operating 10 W argon ion laser, 4 was a Ti:sapphire rod doped with 0.1% Ti, 10 was an AO mode locker, 1–3 were mirrors of which the laser cavity was composed, and 5 was a birefringent filter. A laser oscillation test was conducted by exciting the Ti:sapphire with the argon ion laser while the AO mode locker 10 was driven. The driven frequency of the AO mode locker was 50–200 MHz, but the actual frequency at which mode locking was established varied with fine adjustments of the cavity and had to be controlled with <1% precision. The laser light obtained was tunable over the wavelength range of 730–920 nm and it had an average output of 100–200 mW, with the output per pulse being ca. 1 nJ. The pulse width and peak power were 1–2 psec and 3–5 kW, respectively.

EXAMPLE 6

A laser oscillator having the composition shown in FIG. 7 was fabricated using 0.15 wt% Ti doped sapphire. The light emitted from a high-power semiconductor laser indicated by 11 in FIG. 7 was efficiently injected into a waveguide 22 which generated a second harmonic. The generated second harmonic was focused by a lens 44 to be emitted into a Ti:sapphire rod 33 through its end face. The semiconductor laser operated at a wavelength of 970 nm and its maximum rated power was 100 mW. By pulse oscillation, the laser produced pulsed light having a peak power of 2 W and an energy of 100 μJ per pulse. The second harmonic generated from the waveguide 22 was the Cherenkov radiation and had a wide divergence angle. Therefore, the laser oscillator was so adapted as to focus the second harmonic by the suitable lens system 44 to be efficiently admitted into the Ti:sapphire rod. The second harmonic thus generated from the waveguide 22 had a wavelength of 485 nm, a peak power of 0.5 W and a one-pulse energy of 20 μJ. The Ti:sapphire rod 33 had a length of 15 mm and both end faces were cut to the Brewster's angle. Shown by 55, 66 and 77 in FIG. 7 were mirrors of which the laser cavity was composed and their reflectance was 100%, 100% and 99%, respectively, at 750–850 nm. The laser oscillator having the construction described above produced pulsed light having a wavelength of 780–800 nm, a one-pulse output of 0.3 μJ and a slope efficiency of 2%.

What is claimed is:

1. In a tunable solid laser oscillator of the type that includes a cavity containing titanium-doped sapphire as a laser medium, the improvement comprising: a light source of non-continuous radiation for exciting said laser medium; and a Q-switching mechanism disposed within the cavity at a position where laser light to be produced will make at least one pass through said Q-switching mechanism, said Q-switching mechanism performs Q-switching at a speed no slower than 500 nsec.

2. In a tunable solid laser oscillator of the type that includes a cavity containing titanium-doped sapphire as a laser medium, the improvement comprising: a light source of non-continuous radiation for exciting said laser medium; and a Q-switching mechanism disposed within the cavity at a position where laser light to be produced will make at least one pass through said Q-switching mechanism, wherein said laser medium is excited with light from said light source that is applied in a direction parallel to the optical axis of the laser light to be produced, and wherein said Q-switching mechanism performs Q-switching at a speed no slower than 500 nsec.

3. In a tunable solid laser oscillator of the type that includes a cavity containing titanium-doped sapphire as a laser medium, the improvement comprising: a light source of noncontinuous radiation for exciting said laser medium; and a Q-switching mechanism disposed within the cavity at a position where laser light to be produced will make at least one pass through said Q-switching mechanism, wherein said Q-switching mechanism is an electrooptic or acoustoptic device, and wherein said Q-switching mechanism performs Q-switching at a speed no lower than 500 nsec.

4. In a tunable solid laser oscillator of the type that includes a cavity containing titanium-doped sapphire as a laser medium, the improvement comprising: a light source of non-continuous radiation for exciting said laser medium; and a Q-switching mechanism disposed within the cavity at a position where laser light to be produced will make at least one pass through said Q-switching mechanism, wherein said laser medium is excited with light from said light source that is applied in a direction parallel to the optical axis of the laser light to be produced, wherein said Q-switching mechanism is an electrooptic or acoustooptic device, and wherein said Q-switching mechanism performs Q-switching at a speed no slower than 500 nsec.

5. In a solid laser oscillator of the type that includes a cavity containing titanium-doped single-crystal material as a laser medium, the improvement comprising: a semiconductor laser for providing a semiconductor laser beam for exciting the laser medium, and a Q-switching mechanism which performs Q-switching at a speed no slower than 500 nsec is disposed within the cavity at a position where laser light to be produced will make at least one pass through the Q-switching mechanism, said semiconductor laser emitting the laser light at an intensity of at least 0.5 W, and operating at a wavelength of between 800–1200 nm, and a second harmonic of the laser beam having an intensity of at least 0.1 W and being used as an exciting light source for said laser medium.

6. A solid laser oscillator according to claim 5 wherein said single-crystal material is sapphire.

7. A solid laser oscillator according to claim 6, further comprising a waveguide structure having a nonlinear crystal for generating a second harmonic of the semiconductor laser beam the second harmonic of the semiconductor laser beam being used as the exciting light source for the laser medium.

8. A solid laser oscillator according to claim 7 wherein the semiconductor laser is operated by pulse oscillation.

9. A solid laser oscillator according to claim 6 wherein the semiconductor laser is operated by pulse oscillation.

10. A solid laser oscillator according to claim 5, further comprising a waveguide structure having a nonlinear crystal for generating a second harmonic of the semiconductor laser beam the second harmonic of the semiconductor laser beam being used as the exciting light source for the laser medium.

11. A solid laser oscillator according to claim 10 wherein the semiconductor laser is operated by pulse oscillation.

12. A solid laser oscillator according to claim 5, wherein the semiconductor laser is operated by pulse oscillation.

13. A solid laser oscillator according to claim 12, wherein a light intensity of the pulse oscillation is not less than 5 $\mu$J.

* * * * *